United States Patent [19]

Stine

[11] Patent Number: 5,737,978
[45] Date of Patent: Apr. 14, 1998

[54] TWO-PIECE HOUSING FOR COMPOUND TRANSMISSION

[75] Inventor: Alan C. Stine, Kalamazoo, Mich.

[73] Assignee: Eaton Corporation, Cleveland, Ohio

[21] Appl. No.: 627,808

[22] Filed: Apr. 10, 1996

[51] Int. Cl.$^6$ .................................... F16H 57/02
[52] U.S. Cl. ............................ 74/606 R; 74/325; 74/745
[58] Field of Search ........................ 74/330, 331, 323, 74/745, 606 R

[56] References Cited

U.S. PATENT DOCUMENTS

| | | | |
|---|---|---|---|
| 4,754,665 | 7/1988 | Vandervoort | 74/745 |
| 4,831,892 | 5/1989 | Shindo et al. | 74/606 R X |
| 5,348,518 | 9/1994 | Taniguchi et al. | 74/606 R X |
| 5,370,013 | 12/1994 | Reynolds et al. | 74/330 |
| 5,390,561 | 2/1995 | Stine | 74/331 |
| 5,404,772 | 4/1995 | Jester | 74/606 R |
| 5,467,667 | 11/1995 | Zaiser et al. | 74/606 R |

*Primary Examiner*—Rodney H. Bonck
*Assistant Examiner*—Saúl J. Rodríguez
*Attorney, Agent, or Firm*—Howard D. Gordon

[57] ABSTRACT

A housing (116) for a compound transmission (110) comprising two major pieces is provided. An elongated, generally cup-shaped gear housing piece (190) includes a base portion (194) defining the housing rearward end wall (116B) and a tubular portion (196) extending to a flanged opening (198). A generally cup-shaped clutch housing piece (192) includes a flanged base portion (200) for engaging the flanged opening and defining the transmission forward end wall (116A) and a forwardly flared portion (218) for mounting to the vehicle engine and enclosing the vehicle master clutch.

11 Claims, 5 Drawing Sheets

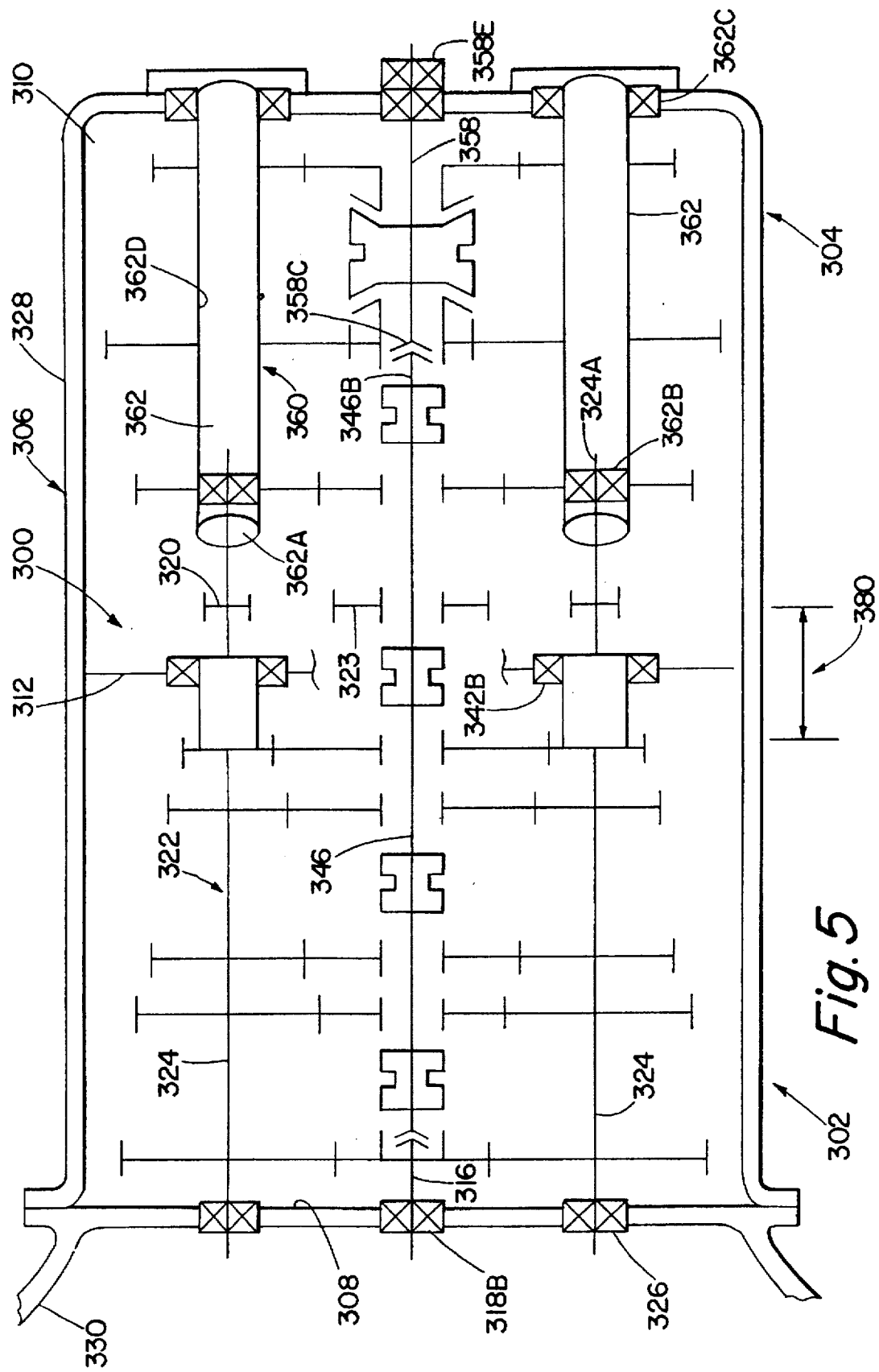

TWO-PIECE HOUSING FOR COMPOUND TRANSMISSION

BACKGROUND OF THE INVENTION

1. Related Applications

The present invention is related to copending U.S. patent application Ser. No. 08/630,581, filed Feb. 13, 1996, entitled REDUCED-LENGTH, HIGH-CAPACITY COMPOUND TRANSMISSION, and assigned to EATON CORPORATION, the assignee of this application.

2. Field of the Invention

The present invention relates to a housing, also called a casing, for a compound-type change-gear transmission. In particular, the present invention relates to a transmission housing for a compound-type transmission comprising an extended generally cup-shaped gear housing piece and a generally cup-shaped clutch housing piece.

3. Description of the Prior Art

Heavy-duty compound transmissions comprising a main transmission section connected in series with one or more auxiliary transmission sections of the range, splitter or combined range-and-splitter type are well known in the prior art, as may be seen by reference to U.S. Pat. Nos. 3,105,395; 4,754,665; 4,944,197; 5,370,013 and 5,390,561, the disclosures of which are incorporated herein by reference.

Briefly, by utilizing main and auxiliary transmission sections connected in series, assuming proper sizing of the ratio steps, the total of available transmission ratios is equal to the product of the main and auxiliary section ratios. Auxiliary transmission sections are of three general types: range type, splitter type or combined range/splitter type.

In compound transmissions having a range-type auxiliary section, the auxiliary section ratio step or steps are greater than the total ratio coverage of the main transmission section ratios used in both ranges, and the main section is shifted progressively through its ratios in each range.

In compound transmissions having a splitter-type auxiliary section, the ratio steps of the splitter auxiliary section are less than the ratio steps of the main transmission section, and each main section ratio is split or subdivided by the splitter section.

In a combined range-and-splitter-type auxiliary section or sections, both range- and splitter-type ratios are provided, allowing the main section to be progressively shifted through its ratios in at least two ranges and also allowing one or more of the main section ratios to be split in at least one range.

One example of a compound transmission having a single combined range/splicer type auxiliary section may be seen by reference to U.S. Pat. Nos. 3,283,613; 3,648,546, the disclosures of which are incorporated herein by reference. Another example is the "Ecosplit" model of transmission sold by Zahnradfabrik Friedrichshafen Aktiengeseushaft of Friedrichshafen, Federal Republic of Germany, which utilizes a separate splitter auxiliary section in front of, and a separate range auxiliary section behind, the main transmission section.

Another example of a compound vehicular transmission having a single combined 3-gear-layer, 4-speed combined splitter/range transmission may be seen by reference to aforementioned U.S. Pat. Nos. 4,754,665 and 4,944,197.

The prior art compound change-gear transmissions, especially the prior art compound transmissions of the type having both range-and-splitter-type auxiliary section gearing, such as the "Roadranger" type, the "Super 10" and "Super 18" types offered by Eaton Corporation, and the "Ecosplit" type offered by Zahnradfabrik Friedrichshafen Aktiengeseushaft, are well received and widely used in manually shifted heavy duty vehicles. However, these and other types of prior art compound change gear transmissions were not totally satisfactory, as these transmissions utilized housings comprising three, four, five or more major pieces, which increased the cost, the required machining and assembly, the weight and the potential for leakage.

SUMMARY OF THE INVENTION

In accordance with the present invention, the drawbacks of the prior art are minimized or overcome by the provision of a compound transmission, preferably a compound transmission having a plurality of main and auxiliary section countershafts, with pairs of the main and auxiliary section countershafts being coaxial, having a housing comprising only two major pieces.

The foregoing is accomplished by utilizing a transmission housing defined by an extended cup-shaped gear housing piece and a cup-shaped clutch housing piece. The gear housing piece has a base portion for defining the transmission rear end wall, and the clutch housing piece has a base portion mounting to the open end of the gear housing piece for defining the forward end wall of the transmission. The generally tubular side walls of the gear housing piece surround and enclose the transmission housing and define bores for receiving the main and auxiliary section shifting mechanisms, while the side walls of the clutch housing piece will mount to the vehicle engine and surround the clutch or other non-positive coupling, drivingly coupling the engine to the transmission. Various minor pieces, such as PTO opening covers, PTO devices and/or bearing covers, may be attached to the two major transmission pieces.

Accordingly, it is an object of the present invention to provide a compound transmission utilizing a new and improved transmission housing.

This and other objects and advantages of the present invention will become apparent from a reading of the following description of the preferred embodiment taken in connection with the attached drawings.

BRIEF DESCRIPTION OF THE DRAWINGS

FIG. 5 is a top view schematic illustration of an alternate embodiment of the present invention.

DESCRIPTION OF THE PREFERRED EMBODIMENT

Figure 1:
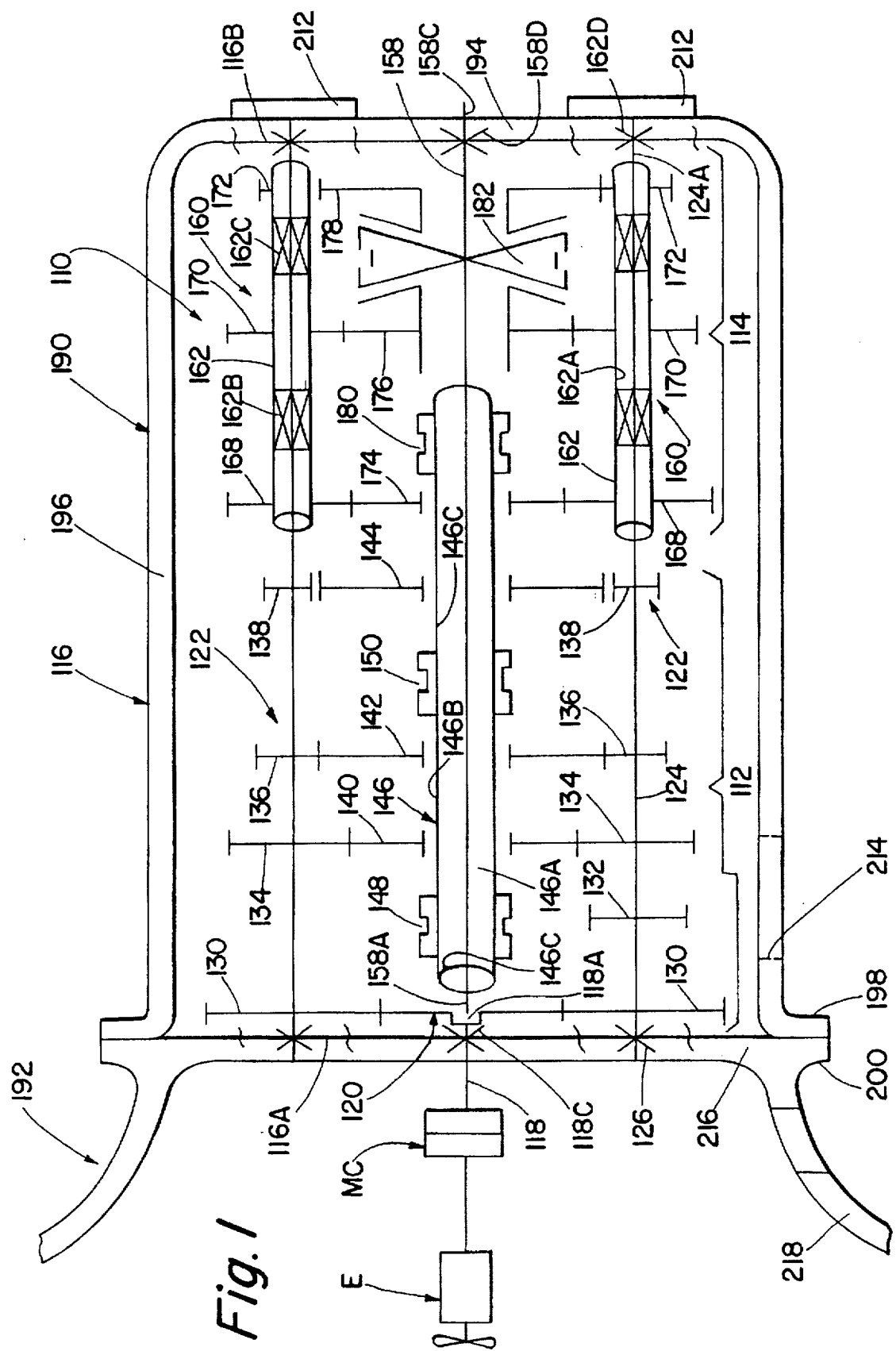
FIG. 1 is a top view schematic illustration of a compound transmission utilizing the new and improved transmission housing of the present invention.

Certain terminology will be used in the following description for convenience in reference only and will not be limiting. The words "upwardly," "downwardly," "rightwardly" and "leftwardly" will designate directions in the drawings to which reference is made. The words "forward" and "rearward" will refer to the front and rear ends, respectively, of the transmission as conventionally mounted in a vehicle, being respectively from the left and right sides of the transmission illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change-speed or change-gear transmission having a main transmission section and an auxiliary transmission section connected in series whereby the selected gear reduction in the main transmission section may be compounded by further selected gear reduction in the auxiliary transmission section.

Figure 2:
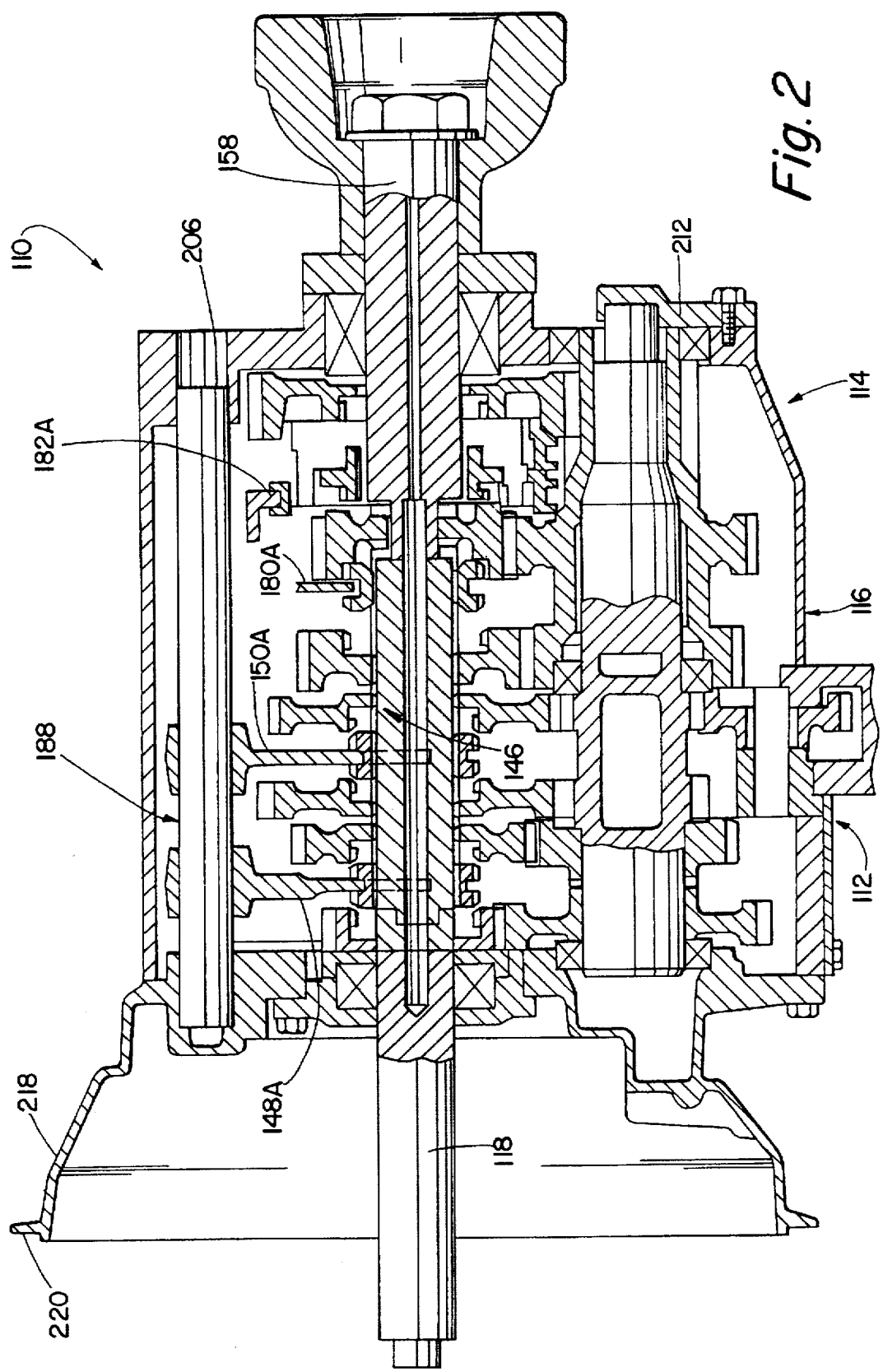
FIG. 2 is a partial plan view, in section, illustrating a transmission and housing of the type shown in FIG. 1.

Transmission 110 of the present invention may be seen by reference to FIGS. 1 and 2. Transmission 110 includes a main section 112 and an auxiliary section 114, both contained within housing 116. Housing 116 includes a forward end wall 116A and a rearward end wall 116B, but not an intermediate wall.

Input shaft 118 carries input gear 120 fixed for rotation therewith and defines a rearwardly opening pocket 118A wherein a reduced diameter extension 158A of output shaft 158 is piloted. A non-friction bushing 118B or the like may be provided in pocket or blind bore 118A. The forward end of input shaft 118 is supported by bearing 118C in front end wall 116A while the rearward end 158C of output shaft 158 is supported by bearing assembly 158D in rear end wall 116B. Bearing assembly 158D may be a pair of opposed taper bearings or a single roller or ball bearing. Input shaft 118 carries a master friction clutch MC for drivingly coupling the crankshaft of engine E to the input shaft.

The mainshaft 146, which carries mainshaft clutches 148 and 150, and the mainshaft splitter clutch 180 is in the form of a generally tubular body 146A having an externally splined outer surface 146B and an axially extending through bore 146C for passage of output shaft 158. Shift forks 148A and 150A are provided for shifting clutches 148 and 150, respectively. Mainshaft 146 is independently rotatable relative to input shaft 118 and output shaft 158 and preferably is free for limited radial movements relative thereto.

The main section 112 includes two substantially identical main section countershaft assemblies 122 each comprising a main section countershaft 124 carrying countershaft gears 130, 132, 134, 136 and 138 fixed thereto. Gear pairs 130, 134, 136 and 138 are constantly meshed with input gear 118, mainshaft gears 140 and 142 and idler 157, which is meshed with reverse mainshaft gear 144, respectively. Multiple, substantially identical countershaft structures are well known in the prior art, as may be seen by reference to U.S. Pat. Nos. 3,105,395 and 3,335,616.

Main section countershaft 124 extends rearwardly into the auxiliary section, where its rearward end 124A is supported directly or indirectly in rear housing end wall 116B.

The auxiliary section 114 includes two substantially identical auxiliary countershaft assemblies 160, each including an auxiliary countershaft 162 carrying auxiliary countershaft gears 168, 170 and 172 for rotation therewith. Auxiliary countershaft gear pairs 168, 170 and 172 are constantly meshed with splitter gear 174, splitter/range gear 176 and range gear 178, respectively. Splitter clutch 180 is fixed to mainshaft 146 for selectively clutching either gear 174 or 176 thereto while synchronized range clutch 182 is fixed to output shaft 158 for selectively clutching either gear 176 or gear 178 thereto.

Auxiliary countershafts 162 are generally tubular in shape defining a through bore 162A for receipt of the rearward extensions of the main section countershafts 124. Bearings or bushings 162B and 162C are provided to rotatably support auxiliary countershaft 162 on main section countershaft 124. Bearing 162D directly or indirectly supports the rear ends of countershafts 124 and 162 in the rear end wall 116B.

Mainshaft 146 is supported solely by the input and/or output shaft, one of the countershafts, main section countershafts 124, extends from the front end wall 116A to the rear end wall 116B and the other countershafts, auxiliary countershafts 162, are tubular members telescopically surrounding the one of the countershafts. As described in aforementioned U.S. Pat. Nos. 5,370,013 and 5,390,561, this improved structure allows elimination of the intermediate wall bearings.

As alternatives to the structure of transmission 110, the input shaft 118 could extend further rearwardly to adjacent the rear end wall 116B or the input and output shafts could have inner ends meeting for mutual support at a point intermediate the end walls of the transmission (see FIG. 2).

One or more of the jaw clutches 148, 150 and/or 180 could be blocked and/or synchronized. While the structure of the present invention is especially advantageous for multiple, substantially identical countershaft type transmissions, it is also applicable to single countershaft and swap-shaft-type transmissions.

As best seen by reference to FIG. 2, main section clutches 148 and 150 are controlled by shift forks 148A and 150A, respectively, associated with a shift shaft mechanism 188, preferably a single-shift-shaft-type mechanism of the type described in U.S. Pats. Nos. 4,621,537 and 4,920,815, the disclosures of which are incorporated herein by reference. Separately, the splitter clutch 180 and range clutch 182 are controlled by shift forks 180A and 182A, respectively, controlled by individual and independent 2- or 3-position actuators. Typically, as is well known, the splitter and range actuators are pressurized, fluid-actuated piston/cylinder assemblies (see U.S. Pat. Nos. 5,199,312 and 5,222,404, the disclosures of which are incorporated herein by reference).

Figure 3:
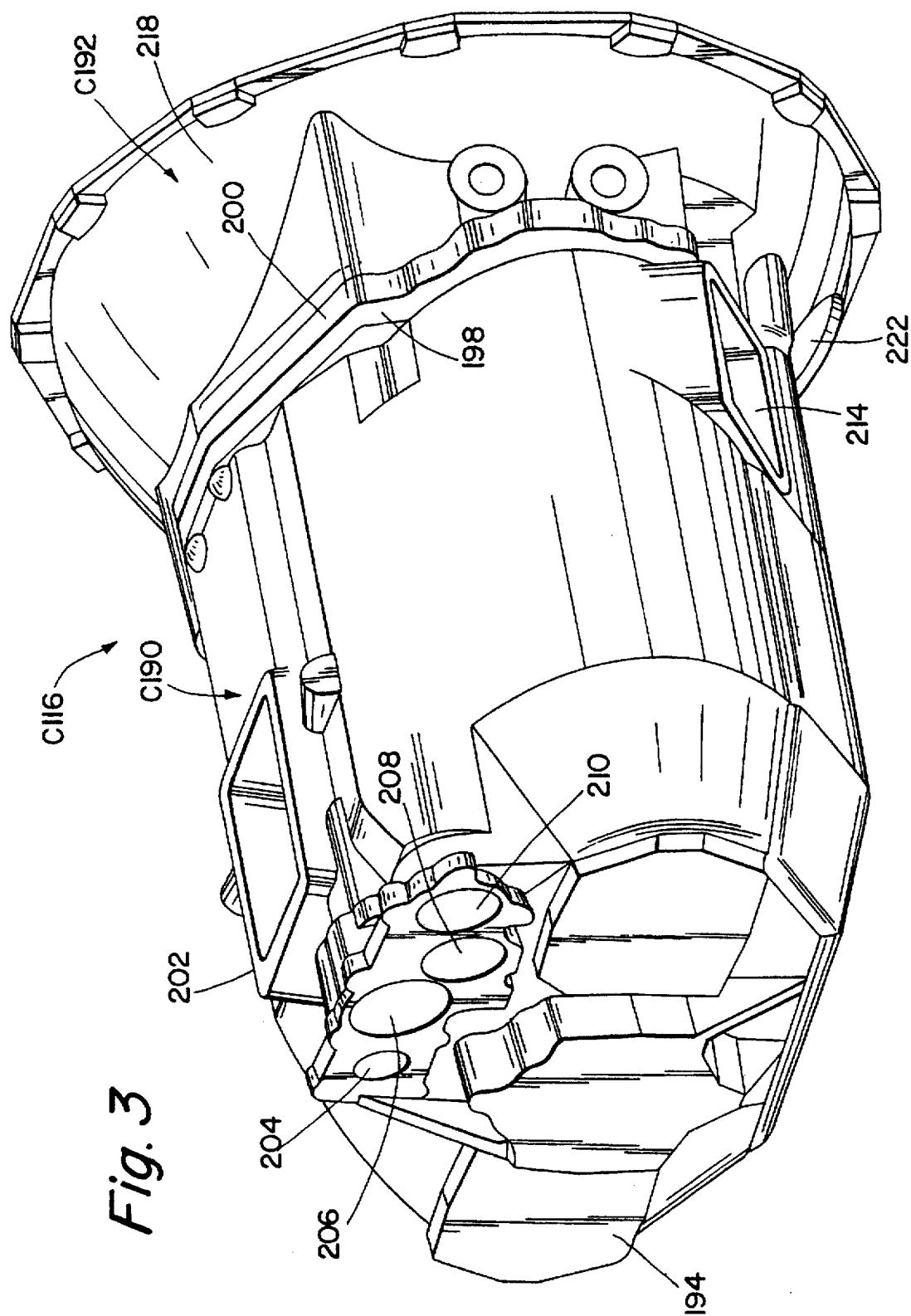
FIG. 3 is a perspective view of the castings utilized to assemble the transmission housing of the present invention.
Figure 4:
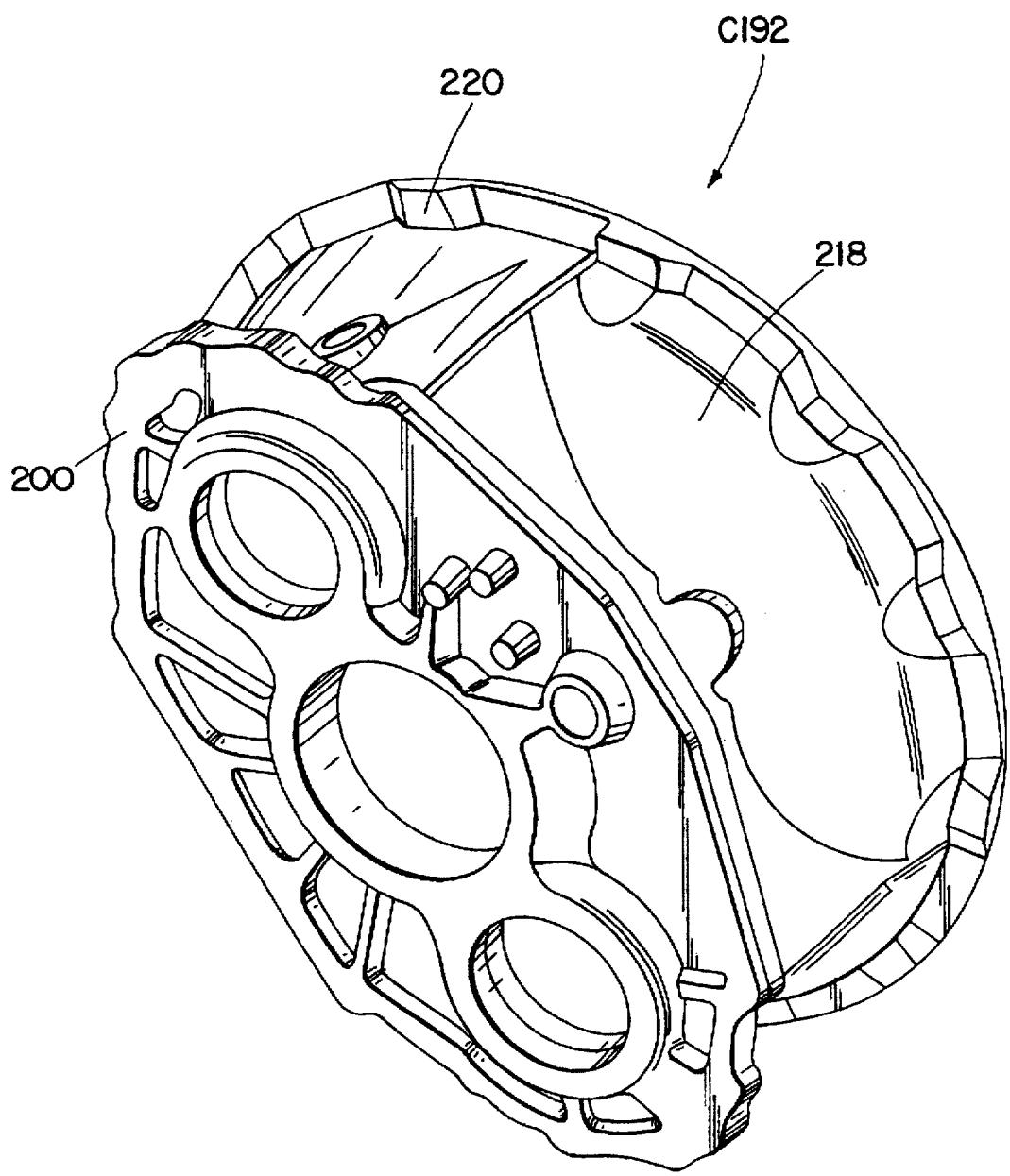
FIG. 4 is a perspective view of the clutch housing piece casting of the housing of FIG. 3.

The transmission housing 116 comprises two major pieces, an extended generally cup-shaped gear housing piece 190 and a generally cup-shaped clutch housing piece 192. The castings C190 and C192 for the housing C116 are shown in FIGS. 3 and 4.

The gear housing piece 190 includes a base 194 which defines the rear end wall 116B, and a generally tubular portion 196 which surrounds and encloses the gearing and extends from the base to a flanged opening 198, which will receive a mating flange 200 provided on the clutch housing piece 192. The upper area of the tubular portion 196 is provided with a shift lever housing opening 202 and a plurality of axially extending bores, 204, 206, 208 and 210, for receiving the splitter piston assembly, the single shift shaft 188, the range piston assembly, and a filter/regulator. The base portion 194 of gear housing piece 190 may include integral covers for the rear countershaft bearings 162A, or separate, removable covers 212 may be utilized. The gearing housing casting C190 will also include provisions for PTO openings, as at 214.

The clutch housing piece 192 will include a flanged base portion 216 defining forward end wall 116A and an outwardly and forwardly extending tubular portion 218 terminating at a forward flanged portion 220 for mounting to the vehicular engine and enclosing the master clutch. The tubular portion 210, preferably, will include an access opening 222 for clutch adjustment and the like.

An alternate embodiment of the present invention, transmission 300, may be seen by reference to FIG. 5. In FIG. 5, there is schematically illustrated a well known and highly commercially successful 18-speed compound transmission 300. Transmission 300 comprises a main transmission section 302 connected in series with an auxiliary transmission section 304 having both range and splitter type gearing. Typically, transmission 300 is housed within a single housing 306 and includes an input shaft 316 driven by a prime mover such as diesel engine through a selectively disengaged, normally engaged master friction clutch.

Transmission 300 is a "(4+1)×(2)×(2)" type compound transmission wherein the main section 302 and auxiliary section 304 are contained within a common housing 306 having a forward end wall 308, a rearward end wall 310 and a partial intermediate wall 312.

Input shaft 316 carries an input gear fixed for rotation therewith and defines an inwardly extending reduced diameter portion, which directly or indirectly supports the front end of mainshaft 346. Output shaft 358 extends from the rear end of transmission 300 and carries an output flange. The inner end of output shaft 358 is provided with a tapered surface for direct or indirect support of the rear end of mainshaft 346. Input shaft 316 is supported in front end wall 308 by taper roller bearing 318B, while output shaft 358 is supported in rear end wall 316B by dual taper roller bearing assembly 358E.

The mainshaft 346 carries mainshaft clutches and the splitter clutch and extends generally coaxially between and is supported by the inner ends of the input and output shafts. Mainshaft gears, a splitter gear and a splitter/range gear surround the mainshaft, preferably for limited radial movement relative thereto, and are selectively clutchable thereto by the clutches. A range clutch is carried by output shaft 358, which is surrounded by the splitter/range gear and a range gear. The range clutch is effective to clutch either gear to the output shaft 358. The function and operation of the auxiliary section of transmission 300 is the same as that of transmission discussed above.

The main and auxiliary section countershaft assemblies, 322 and 360, respectively, are substantially functionally and operatively identical to the main section and auxiliary section countershaft assemblies of transmission 110, described above. The forward ends 362A of the auxiliary countershaft (s) 362 are generally tubular and telescopically surround the rear end 324A of the main section countershafts and are directly or indirectly rotatably supported by bearings 362B thereon. A bearing 326 supports the forward end of main section countershaft 324 in front wall 214A, while a bearing 362C supports the rearward end of auxiliary section countershaft 362 in the rear end wall 214B. The rearward end 324A of main section countershaft 324 is supported by bearing 342B in partial intermediate wall 312, while the forward end 362A of auxiliary countershaft 362 is supported by bearing 362B, carried by a cantilevered rearward end of main countershaft 324.

The mainshaft 346 is thus supported directly or indirectly at its front end by input shaft 316 for a limited amount of radial movement of the mainshaft relative to the axis of rotation of the input shaft. The mainshaft is supported directly or indirectly at its rear end by the output shaft 358 for a limited amount of radial movement of the mainshaft relative to the axis of rotation of the output shaft 358. By eliminating the necessity of an intermediate support for mainshaft 346, the intermediate wall 312 may be of minimal size.

Details of the structure of input shaft 16, mainshaft 346 and output shaft 358 may be further understood by reference to aforementioned U.S. Pat. Nos. 5,370,013 and 5,390,561.

It is a desirable feature of the embodiment of FIG. 5 of present invention that the intermediate wall 312 and the bearings 324B supporting the rearward ends of the front or main section countershafts 324 are located within the axial space 380 required for clutch 64 and its forward and/or rearward travel. Accordingly, the addition of the partial intermediate wall 312 and bearings 324B adds little or no axial length to the transmission 300 as compared to transmissions without an intermediate wall, as seen in aforementioned U.S. Pat. Nos. 5,370,013 and 5,390,561.

In transmission 300, the reverse idler (not shown) is of a relatively enlarged pitch diameter, larger than the pitch diameter of reverse countershaft gear 320, which allows both the reverse mainshaft gear 323 and the reverse countershaft gear 320 to be of a relatively reduced pitch diameter. This allows the inner diameter of bearing 342B to be assembled over the reverse countershaft gear, formed directly on the outer diameter of main section countershaft 324, and permits the main section reverse gear 323 to pass through the central opening in the intermediate wall 312 for assembly purposes. The reverse idler preferably is mounted on an idler shaft cantilever-mounted in housing 306.

As with transmission 110, discussed above, the housing 306 is formed of an elongated cup-shaped gear housing piece 328 and a cup-shaped clutch housing piece 330, the major difference being that the gear housing piece 320 defines the partial intermediate wall portion 312.

Transmissions similar to transmission 300 may be seen by reference to aforementioned copending U.S. patent application Ser. No. 08/600,581.

Accordingly, it may be seen that an improved housing for a compound change-gear transmission comprising two major pieces, an elongated cup-shaped gear housing piece and a cup-shaped clutch housing piece, is provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A transmission housing for a compound transmission comprising a main transmission section (112, 302) connected in series with an auxiliary transmission section (114, 304), said housing having a forward end wall (116A) having cavities for receiving bearings supporting shafts extending into said main transmission section, and a rearward end wall (116B) having cavities for receiving bearings supporting shafts extending into said auxiliary transmission section, and comprising:

an elongated cup-shaped gear housing piece (190) including a base portion (194) defining the transmission rearward end wall and a generally tubular portion (196) extending from the base portion to a flanged opening (198); and a generally cup-shaped clutch housing portion (192) having a flanged base portion (200) for mounting to said flanged opening and defining the transmission forward end wall and an outwardly and forwardly flared portion (218) for mounting to an engine and defining an enclosure for surrounding a vehicular master clutch.

2. The housing of claim 1 wherein said tubular portion defines a plurality of bores for receiving transmission shifting mechanisms.

3. The housing of claim 2 wherein said tubular portion defines a partial intermediate wall (312).

4. The housing of claim 1 wherein said tubular portion defines a partial intermediate wall (312).

5. A compound change-gear transmission comprising a multiple-speed main transmission section connected in series with a multiple-speed auxiliary transmission section, said compound change-gear transmission being one of the range, splitter and combined range/splitter types, said main and auxiliary transmission sections contained within a common transmission housing defining a forward end wall and a rearward end wall, said main transmission section including a main section countershaft carrying at least two main section countershaft gears fixed thereto, and said auxiliary transmission section including an auxiliary section countershaft carrying at least two auxiliary countershaft gears fixed thereto; said main section and auxiliary section countershafts being independently rotatable and coaxial and together defining a coaxial assembly of countershafts supported for rotation in said housing solely by bearings carried by said forward and said rearward end walls; said housing comprising:

an enlongated cup-shaped gear housing piece including a base portion defining the transmission rearward end wall and a generally tubular portion extending from the base portion to a flanged opening; and a generally cup-shaped clutch housing portion having a flanged base portion for mounting to said flanged opening and defining the transmission forward end wall and an outwardly and forwardly flared portion for mounting to an engine and defining an enclosure for surrounding a vehicular master clutch.

6. The transmission of claim 5 wherein said tubular portion defines a plurality of bores for receiving transmission shifting mechanisms.

7. A compound vehicular change gear transmission comprising a multiple speed main transmission section connected in series with a multiple speed auxiliary transmission section said main and auxiliary transmission sections contained within a common transmission housing defining a forward end wall and a rearward end wall;

said main transmission section comprising an input shaft supported for rotation in said housing by input shaft bearing means carried by said forward end wall, at least one input gear fixable to said input shaft, a mainshaft generally coaxial with said input shaft and extending into said auxiliary transmission section, a plurality of substantially identical main section countershafts rotatably supported in said housing and driven by said input shaft, a plurality of main section countershaft gears fixed to each of said main section countershafts, a plurality of mainshaft gears surrounding said mainshaft and constantly meshed with pairs of said main section countershaft gears and main section clutch means carried by said mainshaft for selectively fixing said mainshaft gears to said mainshaft for rotation therewith;

said auxiliary transmission section comprising a plurality of substantially identical auxiliary section countershafts coaxial with said main section countershafts and rotatably supported in said housing, an output shaft generally coaxial with said mainshaft and rotatably supported in said housing by output shaft bearing means carried by said rearward end wall, an auxiliary section countershaft gear fixed to each of said auxiliary section countershafts, at least one auxiliary section central gear generally coaxial with said output shaft and constantly meshed with a pair of said auxiliary section countershaft gears and auxiliary section clutch means for selectively clutching at least one of said auxiliary section central gears and said mainshaft to said output shaft;

the coaxial ones of said main section and auxiliary section countershafts being independently rotatable in said housing with bearing means therebetween and together defining a coaxial assembly of countershafts rotatably supported in said housing solely by bearing means mounted in said forward end wall and in said rearward end wall and intermediate bearing means mounted in an intermediate housing wall axially aligned with one of said main section clutch means; said transmission characterized by said housing comprising:

an enlongated cup-shaped gear housing piece including a base portion defining the transmission rearward end wall and a generally tubular portion extending from the base portion to a flanged opening and defining said intermediate housing wall; and a generally cup-shaped clutch housing portion having a flanged base portion for mounting to said flanged opening and defining the transmission forward end wall and an outwardly and forwardly flared portion for mounting to an engine and defining an enclosure for surrounding a vehicular master clutch.

8. The transmission of claim 7 wherein said tubular portion defines a plurality of bores for receiving transmission shifting mechanisms.

9. The transmission of claim 8 further characterized by said mainshaft being supported in said housing solely by said input shaft and said output shaft.

10. The transmission of claim 7 further characterized by said mainshaft being supported in said housing solely by said input shaft and said output shaft.

11. The transmission of claim 7 wherein one of said mainshaft clutches is selectably movable in an axial space to selectively engage and disengage a selected one of a lowest forward drive ratio mainshaft gear and a reverse drive ratio mainshaft gear to said mainshaft, said intermediate bearing means and intermediate housing wall within said axial space.

* * * * *